UNITED STATES PATENT OFFICE.

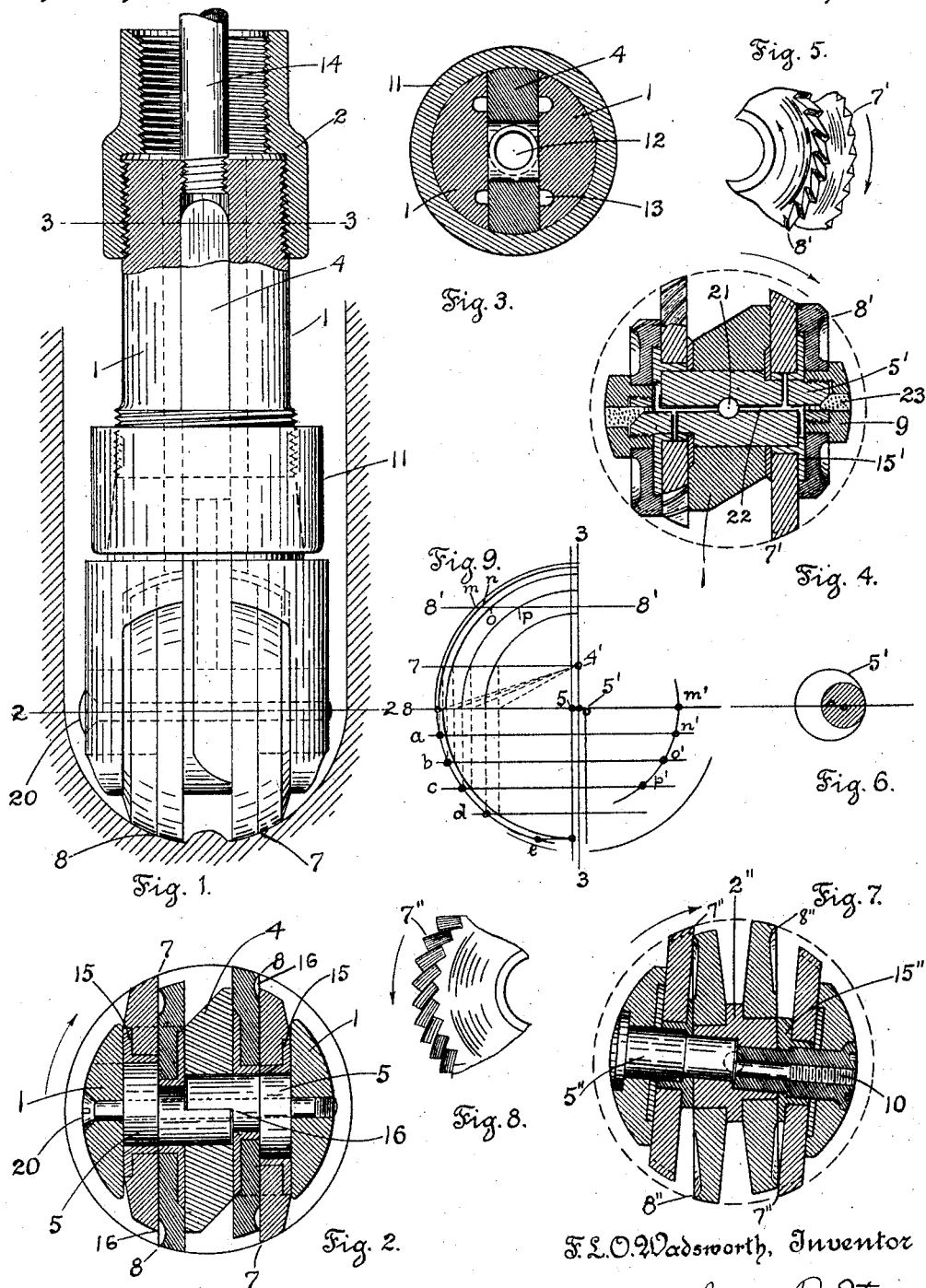

FRANK L. O. WADSWORTH, OF PITTSBURGH, PENNSYLVANIA, ASSIGNOR TO HUGHES TOOL COMPANY, OF HOUSTON, TEXAS, A CORPORATION OF TEXAS.

ROTARY BORING-DRILL.

1,404,915.   Specification of Letters Patent.   Patented Jan. 31, 1922.

Original application filed May 26, 1919, Serial No. 300,004. Divided and this application filed May 10, 1920. Serial No. 380,034.

*To all whom it may concern:*

Be it known that I, FRANK L. O. WADSWORTH, a citizen of the United States, residing at Pittsburgh, Pennsylvania, have invented a certain new and useful Improvement in Rotary Boring Drills, of which the following is a full, clear, and exact description, such as will enable others skilled in the art to which it appertains to make and use the same.

My invention relates to rotary boring drills of the disc type, for use in drilling oil or water wells or in tunnelling; and this application is particularly directed to certain features of improvements that are more generally disclosed in my copending application, Serial No. 300,004, filed May 26, 1919, and issued as Patent No. 1,374,867, April 12, 1921.

One object of this invention is to provide a combination of double acting disc-shaped cutting members which are so formed, and so mounted on the drill head, that the cutting action is performed in part by the forward advancing edges, and in part by the rearward following edges of the said members.

Another object of my improvements is to provide a pair of compound cutting members, arranged one on each side of the drill head, and having the cutting elements of each pair so arranged, in relation to each other, as to operate in a common plane and simultaneously shear away the material from opposite sides of the hole; thereby securing a very rapid and symmetrically balanced action.

Another object of these improvements is to arranged the cutters on the drill head in such offset relationship to each other that they will co-operate most effectively and efficiently in the rapid removal of the material from the end of the bore cavity.

In the drawing, Fig. 1 shows a side elevation of a drill embodying one form of the invention, certain parts being broken away; Fig. 2 is a transverse section on plane of the cutter supporting shaft in Fig. 1; Fig. 3 is a transverse section on the plane 3—3 of Fig. 1; Fig. 4 is a transverse section through the cutter shaft in a drill head such as is illustrated in Fig. 1, showing a different embodiment of the invention; Fig. 5 is a broken side elevation of two of the cutters shown in Fig. 4; Fig. 6 is a transverse section through the threaded end of the cutter shaft shown in Fig. 4, illustrating the position of the disc axes as thus determined from the diagram shown in Fig. 9; Fig. 7 is a sectional plan view, similar to Figs. 2 and 4, illustrating a third modification of this construction; Fig. 8 is a partial side elevation of a cutter illustrating another form of cutting tooth; and Fig. 9 is a diagram illustrating the method of determining the cavity cut by the drill head construction of Fig. 4, and of determining the proper relative location of the axes of the disc members of that construction.

The form of the cutting members, and the novel arrangement for mounting them in offset relation to each other constitute the important features of the improvements hereinafter described and claimed. For the purpose of illustrating various embodiments of the invention several different forms and arrangements of the cutting members have been depicted in the drawings: For example; Figs. 1 and 2 illustrate the said members mounted in separate slots in the base of the head; Fig. 4 illustrates them as mounted on opposite sides of a reduced lower portion of the head in a position such as is shown in the patent to Hughes No. 1,204,157, of November 7, 1916; and Fig. 7 shows them mounted in a single slot in a manner somewhat similar to that illustrated in the Hughes Patent No. 1,238,407, of August 28, 1917.

The novel features of arrangement of my present invention will appear on an inspection of the drawings. In the organization shown in Figs. 1, 2 and 3 the head is made up of two segmental side portions 1, 1, which are threaded at their upper ends to engage with a drill collar 2, and at their lower parts to engage with a second collar 11—and a flat central portion 4, adapted to register with the two side portions and to be locked in place between them by the collars 2 and 11. In this construction each pair of compound cutting members is made up of two discs of slightly different diameter and slightly offset in relation to each other. The positioning of the larger of each of these discs is the reverse of that ordinarily employed in the construction of rotary disc drills, in which the cutters are each offset forwardly, so that only the sharp advancing edges thereof come in contact with the side of the hole. But in my improved arrangement those portions of the two part cutters which are nearest the central axis of the head are offset rearwardly, so that the following edges thereof will come in cutting contact with the side of the hole.

As shown in Fig. 2, each pair of compound cutters is mounted on a shaft support 5 in such manner that the inner discs, carrying the following cutting edges 8, are also offset and revolve eccentrically with respect to the outer discs which carry the advancing cutting edges 7; and these parts are further so arranged that the planes of each pair of cutting edges are coincident, and the four cutting elements are simultaneously and symmetrically engaged with the opposite sides of the cup-shaped cavity in which they are operating.

In the arrangement shown in Figs. 1 to 3, the shaft supports 5 are formed integral with, or are mechanically attached to, the outer members of the three-part drill head; and the inner ends (which are shouldered to overlap each other) engage with the central member 4 of the said head. When the parts are assembled in position, the head sections, and the shaft sections carrying the disc members, are all rigidly clamped together in part by the collars 2 and 11, and in part by the cross bolt 20, which passes through the shaft supports 5—5 and is engaged with the adjacent side portions of the other head members 1—1.

In order to provide a receptacle for the lubricant, the central member 4 of the head is cut away at its middle portion to form a rectangular chamber 12, which communicates at the top with a short section of pipe 14, that extends up into the hollow drill stem and is covered at its upper end with a suitable cap, not shown. Each of the side members 1 of the head is provided with longitudinal slots 13 (as best shown in Fig. 3) which are arranged in opposite sides of the chamber 12, and which serve as passage ways through which the flushing water is carried from the hollow drill stem to the openings in which the cutting discs are located.

The outer periphery of each of the cutter discs is preferably shaped to conform to the curvature of the hole, as shown in the plan view of Fig. 2, in order to most effectively "center" the drill in the hole and prevent "wabbling" or "whipping" of the rotating parts. In order to secure the most efficient cutting action the outer surface of the inner discs are preferably provided with grooves 16 which are so shaped and positioned as to provide a sharp cutting edge 8 on the rearward following side of each of these inner discs. The exterior form of the outer discs—when thus shaped to conform to the curvature of the hole—is such that each of said discs has a sharp cutting edge 7 on the advancing side thereof. A space is thus provided between the forward advancing face of the outer disc and between the wall of the hole and the periphery of the inner cutter to receive the material sheared away by said advancing edge. This material is thus drawn down under the inner disc and further disintegrated. Each of the discs is mounted in the usual manner on a bushing sleeve 15, and either the disc alone, or the discs and sleeves together, can be readily removed and replaced when unduly worn.

In the construction illustrated in plan view of Fig. 4 the two portions of each disc member—one of which carries an advancing cutting edge 7' and the other of which carries a following edge 8'—are mounted on eccentrically disposed portions of shaft supports 5', that are either made integral with the lower end of the drill head 1, or are formed on opposite ends of a common shaft that is secured permanently in the said head. In this arrangement, the cutters are positioned on opposite sides of the lower flattened extremity of a solid cylindrical body member, and are carried on overhanging or projecting portions of the shaft supports thereon. The separate disc elements of each cutting member are held in position on the overhanging ends of these supports by means of threaded sleeves 9, that engage with the outer eccentric portions of the said supports. The bearing surfaces for the separate parts of the disc members are supplied with lubricant through a central opening 21 which leads upward to the lubricant chamber, (not here shown), and which communicates, by means of suitable passage ways 22, with said bearing surfaces. The threaded sleeves 9 are provided with suitable perforations 23 that are eccentrically located with respect to the ends of the longitudinal passage way 22 through the disc shaft supports; and when these sleeves 9 are screwed in place against the bearing sleeves 15' they are locked in position by filling the perforations 23 and the eccentrically located ends of the beforementioned passage way with lead or Babbitt metal. In order to remove these sleeves it is only necessary to melt away this fusible material by means of the locally applied heat of a gasoline torch or other suitable heating device.

In the construction last described the disc parts carrying the following edges 8', 8', are not only offset horizontally with respect to each other—by the amount indicated in the plan view of Fig. 4—but are also offset vertically with respect to each other by the amount indicated in the end view of Fig. 6, which is a sectional end view of the eccentric portions of the shaft 5′, on which the bearing sleeves 15′ and 9 are mounted. This double offsetting is resorted to in order to obtain the most effective cooperation between the advancing cutting edges 7′, 7′, and the following cutting edges 8′, 8′; and the amount of vertical offsetting is determined in the manner indicated in the diagram of Fig. 9. In this diagram the points 8, a, b, c, d, e are the points which determine the generatrix of the surface of revolution described by one of the advancing edges 7′ about the central axis of rotation of the drill head. The partial circles of the upper left hand part of the diagram are those described by the points 8, a, b, c, and d as they revolve to generate the surface of the cut. These circles intersect the plane of the cutting edges 8′, 8′, on the correspondingly designed line of the diagram, the said line being offset from the line 5, 8 by an amount equal to the distance between the axial line of rotation of the drill head and the plane of one of the following cutting edges. The distance from the central line 3, 3, to the intersection of each circle with the line 8, 8, are the chords of the curve m′, n′, o′, p′, which represent the intersection of the vertical plane 8′, 8′, with the surface of the cut described by the advancing cutting edge; and when this curve is thus determined it is an easy matter to find a center 5′, for describing the circle (of the desired radius for the following cutting edge 8′) that will most clearly coincide with the said curve m′ * * * p′. The point 5′ thus found determines the axial line of the shaft support for that part of the disc member that carries the following cutting edge 8′; and as shown in the diagram of Fig. 9, and also as shown in the end view of Fig. 6, this center of the following cutting edge is slightly offset vertically with respect to the center of the advancing cutting edge.

In this last construction the inner disc of each compound cutter is toothed as shown in Figs. 4 and 5; and its periphery is shaped to conform to the curvature of the hole. This member is offset so as to bring its sharp advancing edge in contact with the side of the hole. The two outer discs are each of materially smaller diameter, and are recessed on their outer faces to provide sharp cutting edges 8′, which are brought into cutting engagement with the material on their rearward following sides. The cutting edges of the two elements of each cutter are not therefore on a common plane, as in the preferred embodiment, shown in Figs. 1 and 2; but it will be noted that the cutting strain on each of the compound members is in part balanced by the opposing directions of the thrust on the separate elements thereof.

The illustration of Fig. 7 depicts a second modification of the construction shown in Figs. 1 and 2. In this modification the disc elements which carry the following cutting edges are arranged in vertical parallelism with respect to each other, and are mounted to rotate on a common central sleeve 2″ that is provided at its opposite ends with properly offset eccentric bearing surfaces for the said elements. The disc elements which carry the advancing cutting edges 7″, 7″, are also arranged in vertical parallelism with respect to each other, but these parts are inclined slightly to the elements which carry the following cutting edges 8″, 8″. The bearing sleeve 2″ for the first set of elements and the bearing sleeves 15″, 15″ for the second set of elements, are conjointly mounted on two shaft supports 5″, 5″, that are preferably centrally arranged with respect to the bearing sleeves 15″, 15″, and are preferably provided with reduced ends which enter eccentrically formed openings in the central sleeve 2″; and the parts are held in assembled position with respect to each other by providing one of these shaft supports with a prolongation 10 and centrally threading the other shaft support to engage with this projecting portion 10. In this case the drill head is provided with two downwardly projecting legs between which the disc members are housed on their shaft and bearing sleeve supports.

By thus inclining the inner cutting discs at an angle to the outer ones the edges on both discs may be arranged in more advantageous positions for the cutting operation, as will be readily seen in Fig. 7. This is due, partly to there being more space in which the rearward following edges can work, and partly to the better angle at which these cutting edges are presented to the side of the hole because of the backward "rake" of the inner disc members. In this embodiment all of the cutters are preferably toothed on the periphery, as shown in Fig. 8.

In the operation of my improved organization, the rotation of the drill head—which is customarily in a clock-wise direction as viewed from above—will cause the cutting members to roll on the bottom of the hole, in a counter-clock-wise direction as viewed from the outer ends of their respective shaft supports. The sharp cutting edges, on the advancing sides of two of the revolving disc elements, and on the rearward following sides of the other two discs, act to rapidly and evenly remove the material from the end and side walls of the bore cavity; and the shaping of the peripheries of the cutters to conform to the curvature of the cavity in which they operate provides broad surfaces of cutting engagement which effectively resist wear, or injury, of the cutting edges.

The peripheries of the various cutting discs may be plain, as in Fig. 1, or they may be provided with teeth, as shown in Figs. 4, 5 and 8. In either case the material sheared away by the sharp cutting edges will be ground up and further disintegrated by the broad peripheral surfaces. The cross-sectional form of the teeth which are used may also be varied to meet different conditions of operation; that is to say, they may be formed with two sides of the tooth inclined at the same angle to the peripheral face (as in Fig. 8), or they may be formed with two sides inclined at different angles (as shown in Fig. 5.) The sharpest cutting action—and the greatest tendency of the said cutting action to produce rotation of the cutting members—is, in general, secured by forming the teeth in the manner indicated in Fig. 5; where the teeth on the following edge 8′ have radially cut faces on the under side, and where the teeth on the advancing cutting edge 7′ have radially cut faces on the upper side—(these radially cut faces being, in each case, the ones which come into engagement with the material to be removed from the wall of the bore hole)—and both sets of teeth are inclined backwardly and away from the cutting edge in such manner that they have an effect similar to that on the threads on a screw. The rotation of the head and the reaction of the cut on the inclined faces of the teeth act to assist in the rotation of the cutters on their own axes, and prevent the sticking and "balling up" of the operative parts. It will thus be seen that I have provided a type of rotary drill construction in which the cutting members are so formed and arranged as to operate in a most efficient manner in shearing away and disintegrating the material at the bottom of the bore cavity, and in producing a straight cylindrical bore hole of uniform "gauge" or diameter.

Having thus described my invention, what I claim as new and desire to protect by Letters Patent is:

1. In a rotary boring drill, two opposed cutting members each comprising two separately rotating discs, the outer surface of one said discs being recessed to provide a sharp outer edge thereon, and the inner surface on the other of said discs being left flat to provide a sharp cutting inner edge thereon.

2. A rotary boring drill comprising a head and a two part cutter member mounted on the forward end thereof, one part of said cutter member being smaller and farther from the central axis of the head than the other and offset relative thereto, the periphery of both parts being shaped to conform to the periphery of the hole in the manner and for the purpose described.

3. A rotary boring drill comprising a head and two cutters mounted thereon, each cutter being composed of two separate discs, one offset from the longitudinal axis of the head to cut with the forward advancing edge thereof and the other offset in the opposite direction to cut with the rearward following edge thereof.

4. In a rotary boring drill, a cutting member comprising two sections, the inner one being offset laterally to cut with the rearward following edge and the outer one offset to cut with the forward advancing edge thereof, the cutting edges of both sections operating in the same vertical plane.

5. In a rotary boring drill, the combination of a head and cutting discs journalled on bearing pins at the forward end thereof, the inner ends of said pins being interlocked and held in place by a transverse pin passing therethrough.

6. In a rotary boring drill, the combination of a head, cutting discs journalled on bearing pins at the forward end thereof, the said pins being overlapped and interlocked at their inner ends, and a locking pin extending through the bearing pins longitudinally of the same to maintain the bearing pins in operative relation.

7. A head for a rotary boring drill comprising three separable sections, secured together by threaded collars, the central section being apertured at its upper end to form a lubricating chamber, and the outer sections being grooved on their inner faces to form water ducts, substantially as described.

8. In a rotary boring drill, the combination of a head, two cutting discs rotatably mounted on axes transverse to the axis of the head and provided with recessed cutting edges on their outer faces, and two other cutting discs positioned outside of the aforesaid recessed discs and provided with cutting edges on their inner faces.

9. In a rotary boring drill, the combination of a head, two cutting discs rotatably mounted on axes transverse to the axis of the head and provided with recessed cutting edges on their outer faces, and two other cutting discs positioned onside of the aforesaid recessed discs and provided with cutting edges on their inner faces; the planes of the adjacent outer and inner cutting edges being substantially coincident.

10. In a rotary boring drill, the combination of a head, a cutting-crushing disc member rotatably mounted thereon and provided with an outer recessed face to form a sharp edge on its rearward following side, and another cutting disc rotatably mounted outside of the first mentioned disc and provided with a cutting edge on its inner advancing face; the axes of the two discs being offset laterally with respect to each other so as to form a clearance space between the front downwardly rolling crushing face of the inner disc and the adjacent cutting edge of the outer disc, the said space serving to receive the material cut from the bore wall by the advancing cutting edge of the outer disc, and direct it under the adjacent crushing face of the inner disc substantially as described.

11. In a rotary boring drill, the combination of a head, two cutting members rotatably mounted on axial supports arranged transversely to the axis of the head, the inner ends of said supports being formed with interlocking shouldered portions, and means for holding said shouldered supports in locking engagement with each other and with the head.

12. In a rotary boring drill, the combination of a head and cutting members rotatably mounted thereon, each cutting member being formed of two independently revolvable discs one of which is provided with a forward advancing cutting edge; the said discs being so arranged that the planes of the said cutting edges of each member are substantially coincident.

In testimony whereof, I hereunto affix my signature this the 8th day of May, A. D. 1920.

FRANK L. O. WADSWORTH.